3,189,435
LEACHING OF COPPER FROM ORES WITH CYANIDE AND RECOVERY OF COPPER FROM CYANIDE SOLUTIONS
George William Lower, Bethel, Conn., assignor to American Cyanamid Company, Stamford, Conn., a corporation of Maine
No Drawing. Filed Dec. 1, 1964, Ser. No. 415,208
9 Claims. (Cl. 75—2)

This is a continuation-in-part of application Serial No. 175,349, filed February 23, 1962, now abandoned.

This invention relates to an improved process for the recovery of copper from sulfide ores. More particularly, this invention relates to a unique and commercially useful method by which copper can be recovered from conventionally discardable mineral fractions. Still more particularly, this invention relates to a process whereby sulfide ore fractions including those poor in copper (even those having less than one percent copper) are leached with cyanide solutions to yield soluble cyanides from which copper is recovered by sequential treatment with a critical amount of a water-soluble sulfide and acidification. The invention will be more fully understood by reference to the following general description and specific examples.

Procedures for the recovery of the major copper values in rich sulfide ores are well known and widely practiced. Many are available to handle diverse types of ores and cope with the peculiarities of individual situations. However, a major problem which has confronted the copper mining industry from its inception is the difficulty associated with recovering copper values from low value materials such as low grade concentrates and tailings remaining after the first rougher flotation and the ensuing cleaner flotations have removed perhaps 95% of all the copper from the copper-bearing ore. The immensity of this problem is at once recognized upon the realization that it involves the fate of literally hundreds of tons of copper annually. Yet, until the present time, this vast resource has been virtually unrecoverable and has ended in waste. The primary reason for this, and at the same time, the foremost obstacle in solving the problem, is the high cost of treatment per unit of recovered copper. The proportionally high gangue content in the value-bearing material with which this invention is primarily concerned, generally necessitates handling large amounts of material, use of costly quantities of reagents and tie-up of large plant areas with such proportionally low recovery that expense overbalances return, making this final beneficiation commercially non-feasible.

The fact, nevertheless, remains that large tonnages of copper are now discarded as waste which, if recovered in a quick and economical operation, would increase overall resource utilization and finally decrease the per unit cost of the recovered material. Toward this end, attempts have been numerous and diverse. But conventional methods for treating relatively rich ores, concentrates or rougher tailings are virtually useless. Thus, purely physical methods or chemically induced physical methods, such as flotation procedures, are glaringly ineffective. Known chemical methods show little, if any, improvement thereover. Ammonia leaching gives no extraction. Sulfuric acid leaching extracts only about ten percent of the copper values. Combined sulfuric acid-ferric sulfate extraction, though giving more advantageous extraction percentages (i.e., about 50%) is more costly than the other procedures and still not commercially feasible. Similar considerations preclude use of sulfuric acid-sodium chlorate as leaching agents.

A known chemical method which has prospects of becoming the basis for recovering copper under these adverse conditions is the standard cyanidation method conventionally used in the recovery of noble metals. This method leaches a far larger proportion of the copper from the copper-bearing material than do the others. Using standard conditions, i.e., cyanidation for about 48 hours, with a sodium cyanide to copper molar relationship of about 3.5 to 1, about 80 percent copper is extracted. The copper, which is converted to cyanide derivatives, can be partially recovered by known precipitation methods such as acidification to yield hydrocyanic acid and an insoluble copper cyanide. While the recovery is quite high, so is the cost of reagents since much of the expensive cyanide used as extractant reports in the precipitate and is lost when the precipitate is refined. Another part of the cyanide is lost in the form of thiocyanate. The cost of these losses precludes the use of this process on a commercial basis.

Thus, while some known methods were better than others, none has been really suitable for commercially extracting copper from low-value sulfide ore fractions. In view of the great need for a method that could be employed, it is the major object of the present invention to provide a process whereby copper values can be quickly and economically extracted from sulfide ores and ore fractions containing copper.

In general, cyanidation has been considered commercially useful only with the noble metals, such as gold and silver, or as an additive in a flotation circut. Where quantities approaching that stoichiometrically required for treatment of recoverable base metals have been considered, the process is economically forbidden.

In precious metal circuits, such as gold extraction, the copper present caused a loss of cyanide, and fouled the leach circuits. Cyanides have not been regarded as a commercially useful reagent for the large scale recovery of copper as the primary metal of interest.

This and other objects have been simply and economically attained by the present invention. In accordance therewith it was found that copper could be economically extracted from even low grade ore fractions by use of a critically modified cyanide leaching procedure. Instead of cyaniding copper-bearing material for extended periods of 48 hours and more as in past cyanidation of ores of the noble metals, short leaching times of up to about four hours are employed. Instead of directly acidifying the cyanide solution containing soluble copper, the solution is first treated with a critical stoichiometric deficiency of a soluble sulfide for a short period, prior to acidification. With these changes, an extremely useful process results. Seventy-five precent and more of the copper can be extracted from the copper-bearing material, and this is accomplished with only short leaching times and, therefore, easily satisfies space and equipment requirements. Cyanide losses are maintained at a low minimum, since only a limited quantity of cyanide is converted to thiocyanate and copper is precipitated as the sulfide rather than the cyanide, thus avoiding conditions of cyanide decomposition and loss and permitting its recovery and recycling for further use. By use of only a small quantity of sulfide while yet quickly converting essentially all of the soluble copper cyanide to sulfide of copper, or other insoluble form, three advantages result: (1) cyanide losses and sulfide requirements are kept low; (2) space and equipment requirements are less costly to meet; and (3) conversion of copper to sulfide and precipitation of this copper are efficient, whereas losses of cyanide through thiocyanate formation are kept low. These savings are extremely important and may be better understood by reference to the following equation which gives the accepted course of reaction in an exposed aqueous system containing sulfide, copper and cyanide ions.

$$2Cu_2S + 11NaCN + 2\tfrac{1}{2}O_2 + H_2O \rightarrow$$
$$2NaCu(CN)_2 + 2Na_2Cu(CN)_3$$
$$+ NaCNS + Na_2SO_4 + 2NaOH$$

The reaction goes toward further completion with increased reaction time. If the leaching steps which are used in the present invention were continued for long, instead of the short, periods required herein, sodium cuprocyanides and thiocyanates dominate the reaction product. These soluble products are not precipitated, but remain in solution and thus are not recovered. Subsequent acidification would precipitate the copper as copper cyanide and would thus render the cyanide values useless for further recycling and leaching. The result would be so uneconomical as to make copper recovery by such a process commercially unfeasible.

The practice of the present invention is simple with the knowledge of the foregoing principles.

A copper-bearing material is treated with a cyanide for a short time to leach out the copper and form a cuprocyanide solution. The tailings from this leaching operation are removed by filtration or decantation. The liquors containing soluble copper are treated with a stoichiometric deficiency of a soluble sulfide and with acid, likewise for a short period, to precipitate copper as the sulfide and also to liberate hydrocyanic acid. The latter is collected and reused as desired, either directly or it is neutralized with calcined lime, or other alkalies, for use at a desired time. The precipitated cuprosulfide can be extracted or purified by flotation and other procedures normally employed for such materials or may be smelted directly.

It is an advantage of this invention that any low value copper sulfide ores or ore fractions can be economically used therein. These include raw ore materials, concentrates, tailings, or cleaner flotation tailings and other ore fractions having about 0.5–1.0 percent copper. The invention is also applicable to materials of higher copper content.

Cyanidation can be effected with either inorganic cyanide reagents such as sodium cyanide, potassium cyanide, or calcium cyanide or mixtures of these in high grade or commercial grade; hydrocyanic acid with suitable alkalies such as caustic soda or lime; or organic alpha-hydroxynitriles such as lactonitrile either in pure or by-product form. The useful ratio of cyanide reagent to copper (based on NaCN equivalents) is between about 2½–4 moles of cyanide per mole of copper extracted. NaCN equivalents is standard in the industry for calculating available cyanide in reagents. It is critical that cyanidation conditions be maintained for no longer than a few hours and preferably for less than 90 minutes. This period can be reduced even further, say from 30 minutes down to 10 minutes, under optiumum conditions. The cyanide may be added in stages.

Any soluble sulfide may be used to precipitate the copper from the cyanide solution. Illustrative of these compounds are hydrogen sulfide, sodium sulfide ($Na_2S$), sodium hydrosulfide (NaHS), sodium sulfhydrate (NaHS), calcium sulfide, hydrosulfide, and sulfhydrate, and also ammonium sulfides. It is critical, however, that less than a stoichiometric amount, based on the copper, be employed. In general, a useful range is from 10 to 65% of the theoretically required compound. Preferred usage is in the narrower range of 30 to 50%.

For acidification, generally to a pH below about 5, any acid can be employed, but such readily available and inexpensive acids as sulfuric and hydrochloric are preferred. Acidic gases or gases forming acids in water may be employed. Waste or by-product gases of these types may be used. The preferred practice is to add the soluble sulfide to the pregnant copper liquors followed by addition of the acid or acidic material. This insures complete precipitation of the copper as the sulfide and prevents the precipitation of insoluble copper cyanide, thus eliminating losses of cyanide in the precipitate. However, with careful control the sulfide and the acid may be added simultaneously with excellent results and high recoveries of copper and of cyanide.

Usually the sulfide is added first, and then the acid, as if the solution becomes locally acid, in the absence of adequate sulfide ion supply, cyanide losses are undesirably increased.

Theoretically at least, the alkaline copper cyanide solution can be treated with sulfide, acidified, and the copper sulfide, thus formed as free copper sulfide particles, separated by a flotation step to yield extremely high grade concentrate, with a minimum of losses in the tails. Practically, costs of acid to acidulate, especially in the presence of reserve alkali, and the cost of recovering cyanide, and costs of entrainment losses are greater than costs of separating the gangue before acidification. Under special operating conditions the reversal of steps can be economically practical—for instance if the ore fraction is high grade, free from lime, and acid in low cost supply.

It is postulated that thiocyanate ion and ferrocyanide ion, to the extent present, also serve as a copper precipitant. Thus to the extent that thiocyanate ion and ferrocyanide ion are present, the requirements on sulfide ion for maximum effectiveness are diminished.

In working with ore fractions, countercurrent leaching, staged additions of cyanide, sulfide, and acid may be used. Generally the total surface area of the ore particles is comparatively large, hence to reduce losses from liquids remaining on particle surfaces, washing is normally used. The washing water can be combined with the working liquids. In many instances at least some of the liquid can be recycled to reduce water consumption where water is in short supply.

The equations for the principal reactions occurring are:

$$Cu_2S + 6CN^- = 2Cu(CN)_3^= + S^=$$
$$2Cu(CN_3)^= + S^= + 3H_2SO_4 \rightarrow Cu_2S + 6HCN + 3SO_4^=$$

Within the framework of the foregoing principles, various modifications may be made to adapt the invention to special operating conditions. These will be obvious to those skilled in the art.

The following examples are presented to more fully illustrate the present invention.

EXAMPLE 1

This experiment, which illustrates the present invention, was performed with cleaner flotation tailings of 1.077% copper content from a copper flotation plant in the Western United States. A 500-gram sample of this tailing was leached for one hour at 47% solids with a solution of calcium cyanide containing 56.72 pounds of sodium cyanide equivalent and 1.2 pounds of calcium hydroxide per ton of solids. The suspension was then filtered and the filter cake washed. To the filtrate was added 1.6 pounds of sodium sulfhydrate and 52 pounds of sulfuric acid per ton of ore solids. The sodium sulfhydrate added represents about 25% of that stoichiometrically equivalent to the dissolved copper. The copper content of the liquors was thus precipitated as the sulfide and the hydrocyanic acid formed by the acidification was removed by aeration and recovered in a suspension of lime. The copper sulfide precipitate was then recovered by filtration. In the above treatment, 75.9% of the total copper present in the ore solids was extracted and recovered as a sulfide precipitate assaying 16.95% Cu. Of the total cyanide used, 94.4% was regenerated. The cyanide consumed was 0.2 pound of sodium cyanide equivalent per pound of copper recovered.

It was found that the above copper extraction was obtained in as short a leaching time as ten minutes on this cleaner flotation tailing which was being discarded in quantities of about 4000 tons per day. Thus, the leaching-precipitation procedures of the present invention provide an effective method of recovering about 60,000 pounds of copper per day which is now going to waste at this copper concentrater.

EXAMPLE 2

In order to show the criticality of limiting the leaching time, the following experiment was performed, in which the cleaner tailings of Example 1 were leached with cyanide for 24 hours. Of the total copper present in the ore solids, 80% was extracted by this treatment. The requirement of sodium sulfhydrate to precipitate the copper was 5.6 pounds per ton of ore. The cyanide consumed in the overall process was 0.4 pound of sodium cyanide equivalent per pound of copper extracted. In summary, the increase in copper extraction of about 5% in the above 48-hour treatment was achieved at the expense of a 350% increase in sulfide requirement and a 100% increase in cyanide requirement. This increase in the requirements of these chemicals make the process uneconomical and emphasizes the criticality of limiting the leaching time.

EXAMPLE 3

This invention is applicable to the various types of ore solids encountered in the processing of copper-bearing ores as is illustrated in the following table. In all cases the procedure of Example 1 was followed and sufficient acid was added to liberate the cyanide content of the leach liquors as hydrocyanic acid. This was removed from the system and recovered by passing into suspensions of lime.

Table

| Material Treated | | Percent Total Copper Recovered | Pounds Used Per Pound of Copper Recovered | |
|---|---|---|---|---|
| Test | Type | Percent Cu | NaCN equiv. | Precipitant, equiv. NaHS equiv. |
| 1 | Copper ore | 1.07 | 84.7 | 0.3 | 0.26 |
| 2 | Concentrate from slime flotation. | 2.14 | 76.2 | 0.2 | 0.25 |
| 3 | Slime fractions cycloned from rougher flotation tailings. | 0.58 | 71.1 | 0.25 | 0.21 |

Test 1: Sodium cyanide used as extractant; sodium sulfide used as precipitant.
Test 2: Lactonitrile used as extractant; calcium sulfide used as precipitant.
Test 3: Hydrocyanic acid with lime used as extractant; hydrogen sulfide used as precipitant.

I claim:
1. A process of extracting copper from a low grade sulfide ore fraction which comprises leaching said fraction with an aqueous cyanide solution containing at least about three moles of cyanide per mole of extractable copper, for a time less than about four hours, thereby converting a major part of the copper to a soluble cuprocyanide; treating said cuprocyanide with a stoichiometric deficiency, based on the copper in said cuprocyanide, of a water-soluble sulfied compound and acidifying to a pH below about 5; thereby forming cuprosulfide, and hydrocyanic acid, and precipitating the copper as the cuprosulfide.

2. The process of claim 1 wherein the fraction is leached for a period between about 10 and 90 minutes.

3. The process of claim 1 wherein the water-soluble sulfide is added in an amount equal to about 10 to 65% of the stoichiometric requirement.

4. The process of claim 1 wherein the sulfide ore fraction is a flotation tailing product.

5. A process of extracting copper from a low grade sulfide ore fraction which comprises leaching said fraction with an aqueous cyanide solution containing at least about three moles of cyanide per mole of extractable copper, for a time less than about four hours, thereby converting a major part of the copper to a soluble cuprocyanide; treating said cuprocyanide with a stoichiometric deficiency, based on the copper in said cuprocyanide, of a water-soluble sulfide compound and acidifying to a pH below about 5; thereby forming cuprosulfide and hydrocyanic acid and precipitating the copper; and collecting substantially all of the precipitated copper by flotation.

6. A process of extracting copper from a low grade sulfide ore fraction which comprises leaching said fraction with an aqueous cyanide solution containing at least about three moles of cyanide per mole of extractable copper, for a time less than about four hours, thereby converting a major part of the copper to a soluble cuprocyanide; separating substantially all the soluble cuprocyanide from insolubles; treating the separated cuprocyanide with a stoichiometric deficiency, based on the copper in said cuprocyanide, of a water soluble sulfide compound and acidifying to a pH below about 5; thereby forming cuprosulfide, and hydrocyanic acid, and precipitating the copper as the cuprosulfide.

7. The process of claim 1 wherein the ore fraction contains at least about 0.5% copper.

8. The process of claim 5 wherein the ore fraction contains at least about 0.5% copper.

9. The process of claim 7 wherein at least 50% of the copper in the ore fraction is recovered in the precipitate.

References Cited by the Examiner

UNITED STATES PATENTS

| 900,186 | 10/08 | Merrill | 75—106 |
| 1,226,190 | 5/17 | Cox | 75—117 |
| 1,578,618 | 3/26 | Welch | 75—105 |

BENJAMIN HENKIN, *Primary Examiner.*